Jan. 11, 1955  H. A. SWALLOW  2,698,962
APPARATUS FOR CONTINUOUSLY MILLING PLASTICS
Filed Dec. 3, 1952  3 Sheets-Sheet 1
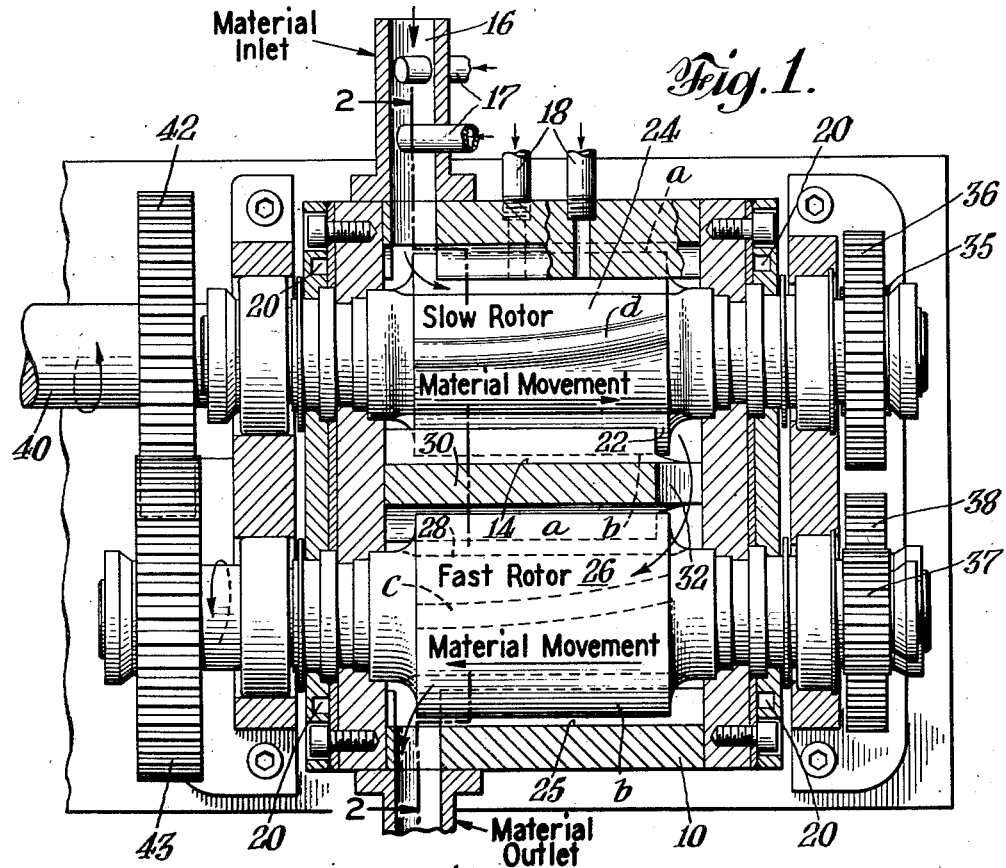
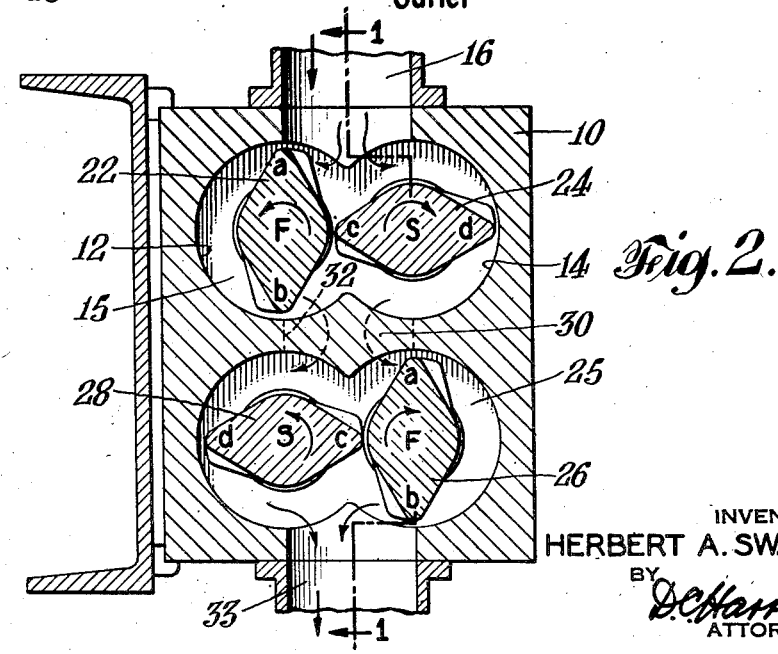
INVENTOR
HERBERT A. SWALLOW
BY
*D. C. Harrison*
ATTORNEY Jan. 11, 1955  H. A. SWALLOW  2,698,962
APPARATUS FOR CONTINUOUSLY MILLING PLASTICS
Filed Dec. 3, 1952  3 Sheets-Sheet 2
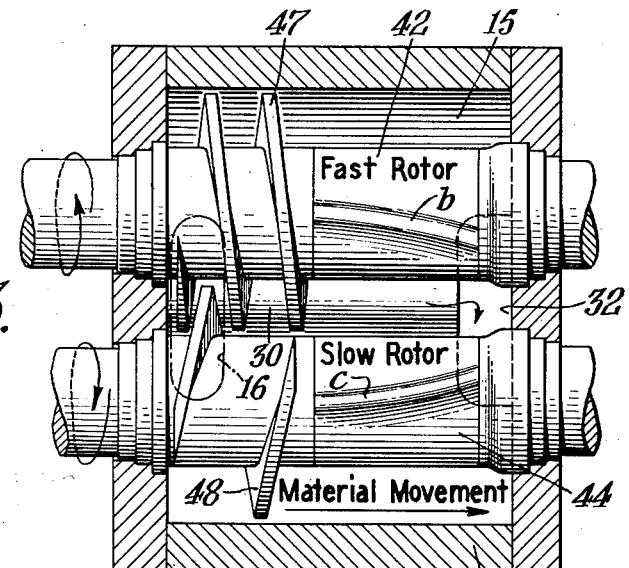
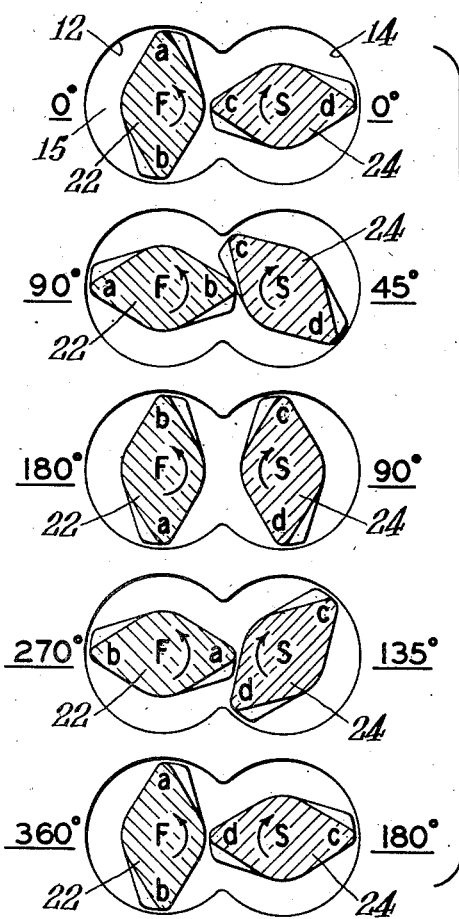
INVENTOR
HERBERT A. SWALLOW

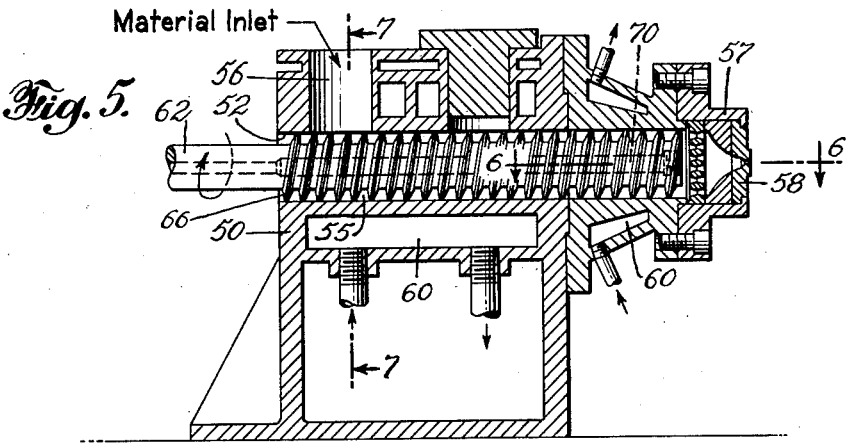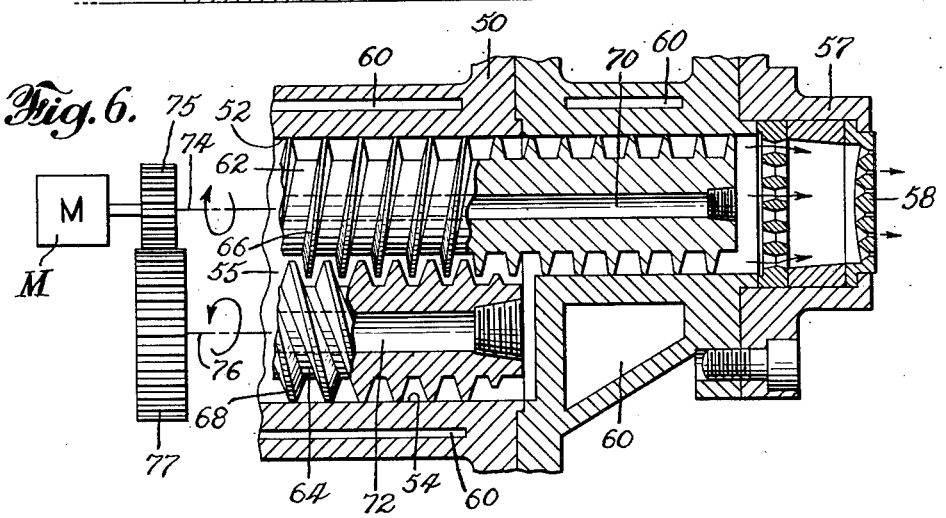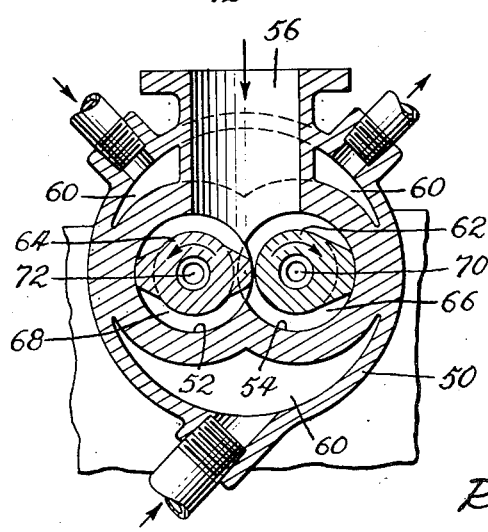

United States Patent Office 2,698,962
Patented Jan. 11, 1955

2,698,962

APPARATUS FOR CONTINUOUSLY MILLING PLASTICS

Herbert A. Swallow, North Branch, N. J., assignor to Union Carbide and Carbon Corporation, a corporation of New York Application December 3, 1952, Serial No. 323,746

13 Claims. (Cl. 18—2)

This application is in part a continuation of my copending application, Serial No. 196,130, filed November 17, 1950.

This invention relates to apparatus for continuously milling and extruding plastics. The milling is generic to mixing, compounding, mechanically working, kneading, masticating, and also fluxing, melting or reducing of solid plastics to a viscous condition. The materials processed in this equipment are normally plastic in nature including thermoplastic and thermosetting resins such as vinyl copolymers, polyethylene and substituted polyethylenes, polystyrene and substituted polystyrenes, the silicone resins, alkyd and polyester resins, and other natural and synthetic rubbers and resins. The foregoing are just examples and should not be construed as restricting the use of the machine to these examples only.

In the milling of plastics, difficulty has been experienced in that certain masses of the charged material of varying size tend to cycle, channel, or idle. Accordingly, portions of the charge which are already mixed are subjected to repeated mixing while some unmixed masses escape. Such escaping portions are carried through without being treated, or at least only partially, resulting in non-uniformity of mixing. This is particularly true of coacting rotors of equal speed and opposite rotation, because the same points on each rotor oppose the same points on the other in each revolution.

It is therefore the main object of the present invention to avoid the difficulties referred to above. Other objects are to prevent such cycling, channeling or idling, to prevent repetition of phases of mixing, to provide differential speed of coacting rotors, to provide apparatus of compact and rugged construction and improved operational features. Also provided is a continuous process of unusual efficiency to obtain controlled mixing and the generation of extremely high longitudinal thrust.

According to the present invention, the fluxed plastic together with modifying ingredients such as petroleum waxes in a liquid state and dry powdered fillers are introduced to a pair of intermeshing rotors rotating on fixed centers in a chamber approximately figure eight cross section. These rotors are of multiple vane construction throughout their length. Each rotor has at least two vanes, blades, or lobes, spaced equidistantly and preferably inclined at a slight helix angle with the rotor axis to promote material movement lengthwise of the shaft. The material feed opening is preferably at one end of the rotor bore normal to the bore axis and the material discharge at the opposite end and opposite side normal to the bore axis. Preferably a duplicate set of rotors is located in the housing in a separate similar bore below the first stage, to decrease the rotor span between the bearings and increase the overall compactness of the unit.

Intermeshing drive gears on external extensions of the rotor shafts drive one rotor at a multiple, or whole number of times and at least twice the speed of its intermeshing counterpart. Intermeshing of the rotors at differential speed is obtained by proper orientation of the vanes between the two rotors.

This rotor action that periodically compresses, shears and stretches the material being mixed can be conducted with heating or cooling of the rotors and housing as conditions require.

Preferably screw threads are incorporated on the rotors in place of the vanes under the material inlet of the mixer housing. This threaded portion of the rotors makes self-feeding of the material a positive action. The pitch or distance between adjacent convolutions of the screw threads on the fast rotor is one of a whole number of equal parts, but not more than half the pitch of the threads on the slow rotor, so that the differential speed is unaffected. The lead or distance which the thread advances in one revolution on the slow rotor is a multiple, or whole number of times and at least twice the lead of the threads on the fast rotor.

With particular regard to the screw thread type of mills, the material being worked may be considered as a nut threaded on the screw. The material as a nut will rotate bodily with the screw, and will not be advanced longitudinally unless its rotation is prevented or retarded.

In a single screw type, the friction on the cylinder walls retards the rotation of the material as a nut, but is largely counteracted by the friction of the material on the screw threads, so that the longitudinal conveying efficiency could be as low as 20%.

With a double screw type, in which the screws rotate in opposite directions at the same speed, there is rolling contact which is the ideal in gear design, the condition of no relative rotation and no friction. Inasmuch as there is always clearance in excess of mere mechanical clearance, the material can pass therethrough without being frictionally retarded.

According to the present invention, the intermeshing screws are rotated in opposite directions at differential speeds, the speed of the fast rotor being a whole number of times, and at least twice, the speed of the slow rotor. In order that the screw threads may intermesh at such differential speeds, the lead or distance which the thread advances in one revolution on the slow rotor is the same multiple or whole number of times, and at least twice the lead of the thread on the fast rotor. Thus on each rotor, the lead of the threads thereon is inversely proportional to its speed.

The thread of the slower speed screw has the effect of a differential abutment relatively stationary with respect to rotation, and projecting into the valley between the threads on the faster speed screw and acting as a plow to stop rotation of the material therebetween. At the same time, this differential abutment moves longitudinally to prevent binding of the screw threads. This action to prevent rotation is entirely in addition to the friction of material against the cylinder wall to stop rotation of the material as a nut, with the resultant increase in efficiency and development of extremely high longitudinal pressure.

Other objects and features of novelty will be apparent from the following description and the accompanying drawings, in which:

Fig. 1 is a vertical longitudinal section through the preferred embodiment of apparatus according to, and for carrying out the method of, the present invention, as taken along the line 1—1 of Fig. 2;

Fig. 2 is a vertical transverse section taken along the line 2—2 of Fig. 1;

Fig. 3 is a horizontal section through a modification;

Fig. 4 is a diagram showing the coaction of the rotors at successive angular intervals;

Fig. 5 is a vertical longitudinal section through a further modified embodiment of apparatus according to the present invention;

Fig. 6 is an enlarged horizontal section of the end portion of the structure shown in Fig. 5; and Fig. 7 is a transverse vertical section taken along the line 7—7 of Fig. 5.

According to the present invention, the plastic together with modifying ingredients such as plasticisers, colorants and fillers are introduced to a pair of intermeshing rotors rotating on fixed centers in a chamber of approximately figure eight cross section. These rotors are of multiple vane construction throughout their lengths. Each rotor has at least two vanes, blades, or lobes, spaced equidistantly and preferably inclined at a slight helix angle with the rotor axis to promote material movement lengthwise of their shafts. The material feed opening is preferably at one end of the rotor bore normal to the bore axis and the material discharge at the opposite end and parallel to the bore axis. Preferably a duplicate set of rotors is located in the housing in a separate similar bore below the first stage, to decrease the rotor span between the bearings and increase the overall compactness of the unit.

The lead or distance which the thread advances in one revolution on the slow rotor is a multiple or whole number of times and at least twice the lead of the threads on the fast rotor.

Intermeshing drive gears on external extensions of the rotor shafts drive the fast rotor at a multiple or whole number of times and at least twice the speed of the intermeshing slow rotor. Thus the lead of the screw threads on each rotor varies inversely as, or is the reciprocal of, the speed of rotation thereof, in terms of whole numbers.

This rotor action that periodically compresses, shears and stretches the material being mixed can be conducted with heating or cooling of the rotors and housing as conditions require.

The effect of the clearance between mating screws is related to the milling and longitudinal thrust. When the screws are operating on a center distance to provide only mechanical clearance, little or no material passes through the bite to be carried around the screw periphery; the milling action in this case is limited mainly to that provided in the longitudinally conveyed bank; however, the longitudinal thrust or so-called extrusion pressure will be at a maximum since this condition can be compared to the restraining from rotation of a nut on a screw and the longitudinal thrust is limited only by the torsional strength of the driving shafts. As the opposite condition is reached wherein the screw center distances are such that the threads barely intermesh, the maximum amount of material will pass through the bite and the conveying action will approach that of a single screw extruder wherein the longitudinal thrust is limited by the friction between the cylinder bore and the material on the screw. Admittedly this last condition will not necessarily produce the optimum amount of mixing so that in practical operation a compromise between these center spacings is made to produce controlled milling and conveying action.

While the operating machine has been built as a double screw unit having screws of equal diameter and a 2:1 speed ratio, the same results and advantage can be obtained by using two or more screws of different diameters rotating at equal speeds and with equal thread leads, thus, obtaining the differential peripheral speed with the attendant high shear rate and the relative movement wherein the threads of one screw act as a relatively stationary abutment to retard rotation.

Referring more particularly to the drawings the mill comprises a housing 10 having parallel intersecting bores 12 and 14 therein, forming a closed chamber 15 of substantially figure eight cross section. The housing 10 is provided with an inlet 16 at one end of the chamber 15 for continuously charging plastic material thereinto. The inlet 16 is provided with perforated feed tubes 17 for liquid ingredients. For greater proportions, feed tubes 18 lead direcly into the chamber 15 through the wall of the housing 10. The housing 10 is provided with passages 20, for heating or cooling medium as desired.

Journaled in the walls of the housing 10 coaxial with the respective bores 12 and 14 are a pair of rotors 22 and 24, which intermesh through the intersection of the bores. Each rotor has longitudinally continuous blades $a$, $b$, and $c$, $d$, of the same cross section and preferably inclined in opposite directions at an acute helix angle to their respective axial planes.

The housing 10 is preferably provided with a duplicate chamber 25 below and parallel to the chamber 15, and a set of rotors 26 and 28 are journaled in the housing 10 coaxial with the intersecting bores thereof. These rotors are identical with the rotors 22 and 24, except that the helix angle and differential speeds are reversed. A partition 30 between the chambers 15 and 25 is provided with an aperture 32 connecting the chambers, and forming an outlet for the chamber 15 and an inlet to the chamber 25. The housing 10 is provided with an outlet 33 for the second stage, preferably vertically aligned with the inlet 16.

The intermeshing rotors 22 and 24, and 26 and 28 are driven in opposite directions at differential speeds, the speed of the fast rotor being a multiple of that of the slow rotor. For this purpose the shaft of the fast rotor 22 has keyed thereto a small drive pinion 35 meshing with a large driven gear 36 keyed to the shaft of the slow rotor 24. Similarly, the shaft of the fast rotor 26 has keyed thereto a small drive pinion 37 meshing with a large driven gear 38 keyed to the shaft of the slow rotor 28. The opposite end of the fast rotor 22 forms the drive shaft 40, which has keyed thereon a drive gear 42 meshing with a driven gear 43 keyed on the shaft of the fast rotor 26 of the second stage. The gears 42 and 43 are of the same size, for a one to one ratio drive. The drive shaft 40 is driven by a suitable source of power not shown.

The operation of the intermeshing rotors is shown diagrammatically in Fig. 4. In the zero position of the slow rotor the blade $c$ thereof faces the side of the fast rotor between its blades $a$ and $b$.

In the 45° position of the slow rotor, the blade $b$ of the fast rotor has rapidly approached the slowly receding blade $c$, thus compressing and extruding the material therebetween, and interchanging material from each blade to the other.

In the 90° position, the blade $b$ has rapidly departed from the slowly receding blade $c$, thus stretching the material therebetween. Also the fast rotor has reversed its position, so that its opposite side is now facing the slow rotor.

In the 135° position, the fast blade $a$ has rapidly passed ahead of the slow blade $d$, thus shearing the material therebetween.

In the 180° position, the fast rotor has returned to the zero position, but the slow rotor has reversed its blades $c$ and $d$. Thus in the 180° position, the opposite blade $d$ of the slow rotor is now facing the original side of the fast rotor. As the cycle is repeated, first one side and then the other of the fast rotor is opposed to and cooperates with, a given side of the slow rotor. Also, various combinations and differential actions of compression, extrusion, stretching and shear take place without repetition of the action as the cycle of rotation is repeated.

In the modification shown in Fig. 3, a fast rotor 42 intermeshes with a slow rotor 44 in the figure eight chamber 15. In place of the blades under the material inlet 16 the rotors have intermeshing screw threads, the threads 47 on the fast rotor 42 having half of the pitch of the threads 48 on the slow rotor 44. The lead of the threads on the slow rotor is a multiple of the lead of the threads on the fast rotor. These intermeshing screw threads 47 and 48 cause a positive feed of the material from the inlet 16 to the rotor blades, and on out through the outlet 32. The housing 10 is the same as that shown in Figs. 1 and 2, and the second stage is identical.

This unit has been constructed and proved to be particularly effective for the compounding of high viscosity materials such as polystyrene with waxes, colors, fillers, and the like.

Referring more particularly to the modification shown in Figs. 5, 6 and 7 of the drawings the mill comprises a housing 50 having parallel intersecting cylindrical bores 52 and 54 therein, forming a closed chamber 55 of substantially figure eight cross section. The housing 50 is provided with an inlet 56 at one end of the chamber 55 for continuously charging plastic material thereinto, and an outlet 57 for the continuous discharge of milled plastic material therefrom. In the form shown the outlet 57 is provided with an extrusion die 58, to form a combined mill and extruder. The housing 50 is provided with passages 60, for heating or cooling medium as desired.

Journaled in the walls of the housing 50 coaxial with the respective bores 52 and 54 are a pair of rotors 62 and 64, which intermesh through the intersection of the bores. The rotors have intermeshing screw threads, the lead of the threads 68 on the slow rotor 64 being a whole number of times and at least twice the lead of the threads 66 on the fast rotor. The rotors both have axial bores 70 and 72 forming passages for heating or cooling medium.

The intermeshing rotors 62 and 64 are driven in opposite directions at differential speeds, the speed of the fast rotor being a multiple or whole number of times and at least twice the speed of the slow rotor. For this purpose an extension 74 of the shaft of the fast rotor 62 has keyed thereto a small drive pinion 75 and is driven by a suitable source of power M. The pinion 75 meshes with a larger driven gear 77 keyed onto the extension 76 of the shaft of the slow rotor 64. The gear 77 has a diameter and number of teeth a multiple or whole number of times and at least twice the diameter and number of teeth of the drive pinion 75.

This unit has been constructed and proved to be particularly effective for the compounding and extrusion of high viscosity materials such as polystyrene, polyvinyl chloride, polyethylene, and phenol-formaldehyde thermosetting materials.

I claim:

1. Method of continuously milling plastics, which comprises continuously charging plastic material into one end portion of a closed chamber of substantially figure eight cross section of intersecting cylinders, rotating the material in the respective cylinders in opposite directions and at differential speeds of which the faster speed is a whole number of times and at least twice the slower speed, interchanging portions of the material from one cylinder to the other through the intersection thereof, simultaneously continuously forcing the material axially of said cylinders and away from the charging end thereof, the number of such portions received from the fast cylinder per revolution of the slow cylinder being a whole number of times and at least twice the number of portions received from the slow cylinder, and continuously discharging the milled material from the other end of said chamber by said continuous axial force.

2. Method of continuously milling plastics, which comprises continuously charging plastic material into one end portion of a closed chamber of substantially figure eight cross section of intersecting cylinders having parallel axes, rotating the material in the respective cylinders about their axes in opposite directions and at differential speeds of which the faster speed is a whole number of times and at least twice the slower speed, interchanging a portion of the material in the slow cylinder with a corresponding portion of the material in the fast cylinder through the intersection thereof in one cycle, interchanging a portion of the material in the slow cylinder with an angularly displaced portion of the material in the fast cylinder through the intersection thereof in a subsequent cycle, simultaneously continuously forcing the material axially of said cylinders and away from the charging end thereof, and continuously discharging the milled material from the other end of said chamber by said continuous axial force to the charging end of another chamber of the same cross section wherein the same operation takes place but the axial force is in the opposite direction.

3. Method of continuously milling plastics, which comprises continuously charging the plastic material into one end portion of a closed chamber of substantially figure eight cross section of intersecting cylinders containing respective oriented intermeshing rotors, rotating said rotors with the charged material thereon in their respective cylinders in opposite directions and at differential speeds of which the faster speed is twice the slower speed, interchanging portions of the material from one intermeshing part of one rotor to a different intermeshing part of the other through the intersection of said cylinders in successive cycles, simultaneously continuously forcing the material axially of said cylinders and away from the charging end thereof, and continuously discharging the milled material from the other end of said chamber by said continuous axial force.

4. Method of continuously milling plastics, which comprises continuously charging the plastic material into one end portion of a closed chamber of substantially figure eight cross section of intersecting cylinders containing respective oriented intermeshing rotors, rotating said rotors with the charged material thereon in their respective cylinders in opposite directions and at differential speeds of which the faster speed is a whole number of times and at least twice the slower speed, interchanging a portion of the material carried by one side of the slow rotor through the intersection of said cylinders with material carried by the corresponding side of the fast rotor in one cycle, interchanging another portion of the material carried by said one side of the slow rotor through the intersection of said cylinders with material carried by the opposite side of the fast rotor in the next cycle, simultaneously continuously forcing the material axially of said cylinders and away from the charging end thereof, and continuously discharging the milled material from the other end of said chamber by said continuous axial force.

5. Apparatus for continuously milling plastics, which comprises means for continuously charging plastic material into one end portion of a closed chamber of substantially figure eight cross section of intersecting cylinders containing intermeshing rotors, means for rotating the rotors with the charged material thereon in the respective cylinders in opposite directions and at differential speeds of which the faster speed is a whole number of times and at least twice the slower speed, means for interchanging portions of the material from one cylinder to the other through the intersection thereof and simultaneously continuously forcing the material axially of said cylinders and away from the charging end thereof, the number of such portions received from the fast cylinder per revolution of the slow cylinder being a whole number of times and at least twice the number of portions received from the slow cylinder, and means for discharging the milled material from the other end of said chamber by said continuous axial force.

6. Apparatus for continuously milling plastics, which comprises means for continuously charging the plastic material into one end portion of a closed chamber of substantially figure eight cross section of intersecting cylinders containing respective intermeshing rotors, said rotors each having a non-reentrant cross sectional contour, means for rotating said rotors with the charged material thereon in the respective cylinders in opposite directions and at differential speeds of which the faster is a whole number of times and at least twice the slower speed, the contours of said rotors being oriented to permit intermeshing thereof at said differential speeds and interchanging portions of the material from one intermeshing part of one rotor to a different intermeshing part of the other in successive cycles, and said rotors being of the same cross section throughout their length but disposed at opposite acute helix angles to their respective axial planes to force the material axially of said cylinders and away from the charging end thereof, said force discharging the milled material from the other end of said chamber.

7. Apparatus for continuously milling plastics, which comprises a housing having parallel intersecting bores therein forming a closed chamber of substantially figure eight cross section and having a charging inlet and a discharge outlet, rotors journaled in said housing coaxial with the respective bores having flat sided cross sectional contours and intermeshing through the intersection thereof, and means for driving said rotors in opposite directions at differential speeds of which the faster is twice the slower speed, the contours of said rotors being oriented to permit intermeshing thereof at said differential speeds and continuous throughout their length but disposed at opposite acute helix angles to their respective axial planes to force the material axially of said cylinders away from said charging inlet and out through the discharge outlet.

8. Apparatus for continuously milling plastics, which comprises a housing having parallel intersecting bores therein forming a closed chamber of substantially figure eight cross section, rotors journaled in said housing coaxial with the respective bores and having longitudinally continuous blades of the same cross section throughout their length and having a non-reentrant contour and intermeshing through the intersection of said bores, and means for driving said rotors in opposite directions at differential speeds of which the faster is a whole number of times and at least twice the slower speed, said blades being oriented to permit intermeshing thereof at said differential speeds.

9. Apparatus for continuously milling plastics, which comprises a housing having parallel intersecting bores therein forming a closed chamber of substantially figure eight cross section, rotors journaled in said housing coaxial with the respective bores and having longitudinally continuous blades each having a non-reentrant cross sectional contour, said blades being inclined in opposite directions at an acute helix angle to their respective axial planes and intermeshing through the intersection of said bores, and means for driving said rotors in opposite directions at differential speeds of which the faster is a whole number of times and at least twice the slower speed, said blades being oriented to permit intermeshing thereof at said differential speeds.

10. Apparatus for continuously milling plastics, which comprises a housing having parallel intersecting bores therein forming a closed chamber of substantially figure eight cross section, oriented rotors journaled in said housing coaxial with the respective bores and intermeshing through the intersection thereof, the charging ends of said rotors having intermeshing screw threads thereon, and means for driving said rotors in opposite directions at differential speeds of which the faster is a whole number of times and at least twice the slower speed, the pitch of the threads on the slow rotor being a multiple of and at least twice the pitch of the threads on the fast rotor.

11. Apparatus for continuously milling plastics which comprises a housing having parallel intersecting bores therein forming a closed chamber of figure eight cross section, rotors journaled in said housing coaxial with the respective bores and having screw threads thereon intermeshing through the intersection thereof, and means for driving said rotors in opposite directions at peripheral speeds of which the faster speed is a whole number of times and at least twice the slower speed, the lead of the threads on the slow rotor being the same whole number of times and at least twice the lead of the threads on the fast rotor.

12. Apparatus for continuously milling plastics which comprises a housing having parallel intersecting bores therein forming a closed chamber of figure eight cross section, rotors journaled in said housing coaxial with the respective bores and having screw threads thereon intermeshing through the intersection thereof, and means for driving said rotors in opposite directions at peripheral speeds of which the faster is twice the slower speed, the lead of the threads on the fast rotor being half of the lead of the threads on the slow rotor.

13. Apparatus for continuously milling plastics which comprises a housing having parallel intersecting bores therein forming a closed chamber of figure eight cross section, right and left hand screws journaled in said housing coaxial with the respective bores and having their threads intermeshing through the intersection thereof, and means for rotating said screws in opposite directions at speeds of which the faster speed is a whole number of times and at least twice the slower speed, the lead of the threads on the slow screw being the same whole number of times and at least twice the lead of the threads on the fast screw, and the lead of the threads on each screw being inversely proportional to its speed of rotation.

References Cited in the file of this patent

FOREIGN PATENTS 450,973    Italy                  Aug. 19, 1949